(12) United States Patent  
Golden et al.

(10) Patent No.: US 9,327,741 B2
(45) Date of Patent: May 3, 2016

(54) SYSTEM AND METHOD INTEGRATING AN ENERGY MANAGEMENT SYSTEM AND YARD PLANNER SYSTEM

(71) Applicant: GENERAL ELECTRIC COMPANY, Schenectady, NY (US)

(72) Inventors: Samuel Golden, Melbourne, FL (US); Jared Cooper, Melbourne, FL (US); Robert Foy, Melbourne, FL (US); David Peltz, Melbourne, FL (US)

(73) Assignee: General Electric Company, Schenectady, NY (US)

( * ) Notice: Subject to any disclaimer, the term of this patent is extended or adjusted under 35 U.S.C. 154(b) by 232 days.

(21) Appl. No.: 14/226,921

(22) Filed: Mar. 27, 2014

(65) Prior Publication Data

US 2015/0274184 A1  Oct. 1, 2015

(51) Int. Cl.
*B61L 17/02* (2006.01)
*B61L 27/00* (2006.01)
*B61L 17/00* (2006.01)

(52) U.S. Cl.
CPC ............. *B61L 17/00* (2013.01); *B61L 27/0016* (2013.01); *B61L 27/0022* (2013.01); *B61L 27/0027* (2013.01)

(58) Field of Classification Search
USPC .......................................................... 701/19
See application file for complete search history.

(56) References Cited

U.S. PATENT DOCUMENTS

| | | | | |
|---|---|---|---|---|
| 6,587,738 B1 * | 7/2003 | Belcea | ................ | B61L 27/0027 700/33 |
| 9,156,477 B2 * | 10/2015 | Cooper | .................. | B61L 3/006 |
| 2005/0279242 A1 * | 12/2005 | Maier | ....................... | B60L 7/04 105/26.05 |
| 2007/0219681 A1 * | 9/2007 | Kumar | .................... | B61L 3/006 701/19 |
| 2009/0187291 A1 * | 7/2009 | Daum | .................... | B61L 3/006 701/2 |
| 2012/0277940 A1 * | 11/2012 | Kumar | ................ | B61L 27/0027 701/20 |
| 2013/0144670 A1 * | 6/2013 | Kickbusch | ............. | G06Q 10/06 705/7.12 |
| 2013/0171590 A1 * | 7/2013 | Kumar | .................... | B61L 3/006 434/62 |
| 2013/0206862 A1 * | 8/2013 | Worden | ................ | B61C 15/107 239/99 |
| 2014/0094998 A1 * | 4/2014 | Cooper | .................. | B61L 3/006 701/2 |
| 2014/0330460 A1 * | 11/2014 | Schoonmaker | ......... | B61C 17/12 701/19 |

* cited by examiner

*Primary Examiner* — Shelley Chen
(74) *Attorney, Agent, or Firm* — GE Global Patent Operation; John A. Kramer

(57) ABSTRACT

A method and system for identifying cargo-carrying vehicles (CCV) to be included in a vehicle system that are non-propulsion-generating vehicles scheduled to depart from a vehicle yard and travel to one or more destination locations at a predetermined departure time. Further includes, calculating a minimum tractive effort threshold required by one or more propulsion-generating vehicles (PGV) to propel the vehicle system to the one or more destination locations along a route within a predetermined time period. And selecting a set of one or more PGV from a larger group of PGV within the vehicle yard to be included in the vehicle system. The set of one or more PGV produce a tractive effort of at least the minimum tractive effort threshold, and having at least one of a lower fuel consumption or lower emissions than selecting one or more of the remaining PGV from the larger group of PGV, respectively.

11 Claims, 5 Drawing Sheets

SYSTEM AND METHOD INTEGRATING AN ENERGY MANAGEMENT SYSTEM AND YARD PLANNER SYSTEM

BACKGROUND

A transportation network for vehicle systems can include several interconnected main routes on which separate vehicles travel between locations to deliver or receive payloads. For example, a transportation network may be formed from interconnected railroad tracks with rail vehicles traveling along the tracks. The vehicles may travel according to schedules that dictate where and when the vehicles are to travel within the transportation network. The schedules may be coordinated with each other in order to arrange for certain vehicles to arrive at various locations in the transportation network at desired times and/or in a desired order.

The transportation network may include a vehicle yard or route hub, such as a rail yard or a distribution warehouse that includes a relatively dense grouping of routes or locations where several vehicles can congregate, deliver payloads, receive new payloads, perform maintenance, refuel, or the like. While in the vehicle yard, vehicles are assigned or paired with payloads based on power or ability of the vehicle to pull to carry the payload regardless on the overall energy or emission efficiency of available vehicles or the availability of vehicles in other vehicle yards within the transportation network. Thus, a need exists to increase the operation efficiency of the vehicle yards.

BRIEF DESCRIPTION

In an embodiment, a method includes identifying cargo-carrying vehicles (CCV) to be included in a vehicle system. The CCV are non-propulsion-generating vehicles scheduled to depart from a vehicle yard and travel to one or more destination locations at a predetermined departure time. The method further includes calculating with one or more processors, a tractive effort threshold required to propel the vehicle system to the one or more destination locations along a route within a predetermined time period. This threshold may be the minimum amount of tractive effort required to propel the vehicle system, or another, larger amount of tractive effort. The method further includes selecting, with the one or more processors, a set of one or more propulsion generating vehicles (PGV) from a larger group of PGV within the vehicle yard to be included in the vehicle system. The set of one or more PGV produces a tractive effort that is at least as large as the tractive effort threshold. The set of one or more PGV also consumes less fuel and/or generates fewer emissions than selecting one or more of the remaining PGV from the larger group of PGV for inclusion in the set. For example, the PGV in the set consume less fuel and/or generate fewer emissions while also providing the tractive effort threshold than would another set of PGV that also produce at least the tractive effort threshold.

It should be noted, as used herein, the term "vehicle yard" can refer to a grouping of interconnected routes at a central location or relatively close to each other and/or where several vehicles can concurrently stop for maintenance, refueling, re-ordering of the vehicles relative to each other, or the like. Examples of vehicle yards may include, but are not limited to, interconnected railroad tracks at rail yards, airline routes condensing at hubs (e.g., airports), truck routes at distribution centers, shipping routes converging at waterways or ports, or the like.

In an embodiment, a control system includes a yard planner system having one or more processors. The yard planner system is configured to create a yard plan for a vehicle yard that includes vehicle connection plans for coupling a selection of one or more propulsion generating vehicles (PGV) with a selection of one or more cargo-carrying vehicles (CCV) to form a first vehicle system. The yard plan is further created based on a movement plan and a vehicle system configuration of the first vehicle system.

The control system also includes a schedule system having one or more processors. The schedule system is configured to create the movement plan of the first vehicle system. The movement plan includes a destination location and predetermined arrival time of the first vehicle system along a route.

The control system further includes an energy management system having one or more processors. The energy management system is configured to determine the optimized vehicle system configuration. The optimized vehicle system configuration includes the selection of the one or more PGV from a vehicle inventory, having a larger group of PGV, based on the movement plan of the first vehicle system and a tractive effort of the selection of the one or more PGV.

BRIEF DESCRIPTION OF THE DRAWINGS

The present inventive subject matter will be better understood from reading the following description of non-limiting embodiments, with reference to the attached drawings, wherein below.

DETAILED DESCRIPTION

Figure 1:
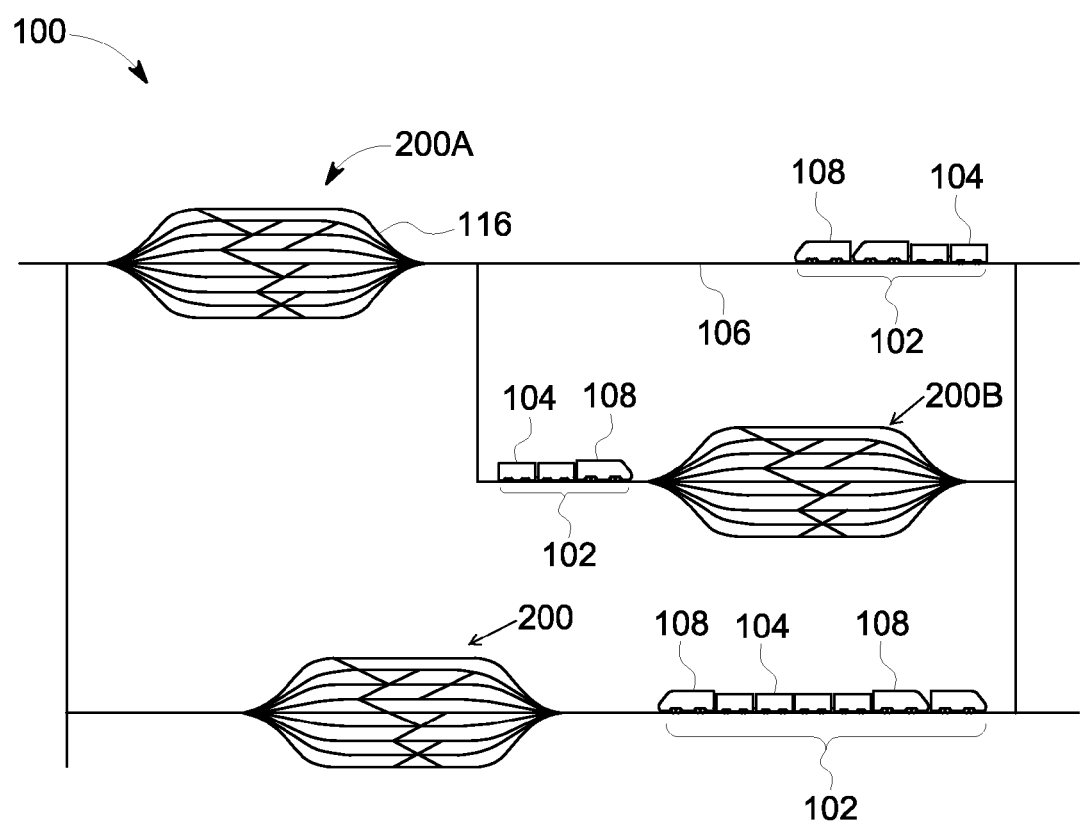
FIG. 1 is a schematic diagram of a transportation network of an embodiment.

One or more embodiments herein described provide systems and methods for coordinating a selection of one or more propulsion-generating vehicles (PGV) for forming a vehicle system having one or more cargo-carrying vehicles (CCV). The PGV may be traveling to (e.g., heading inbound to) a vehicle yard (e.g., for repair and/or maintenance of the PGV, to obtain additional fuel, to unload cargo and/or CCV off of another vehicle system, to load cargo and/or CCV onto the PGV to form the vehicle system, to sort the PGV among other PGV, or the like) or be stored within or at the vehicle yard. The vehicle yard may act as a transportation hub within a transportation network, such as when the vehicle yard is coupled with several routes extending away from the vehicle yard for the vehicle system to travel along to reach other destinations. The vehicle yard may be a final destination location of a trip of the vehicle system, or may be an intermediate location as a stopping off point when the vehicle system is traveling to another business destination (e.g., the destination to which the vehicle system is contracted to travel).

The vehicle yard may have a capacity to receive vehicle systems into the vehicle yard. This capacity can be a space limitation on the number of vehicle systems that can exit off of a main line route into the vehicle yard. Additionally or alternatively, the capacity can be a throughput limitation on the number of vehicle systems the vehicle yard can partition (e.g., removing or separating the CCV or PGV from the vehicle system) or form (e.g., coupling the CCV or PGV into the vehicle system). As vehicle systems come and go from the vehicle yard, the availability or amount of PGV to select from to form alternative configurations of the vehicle systems with the one or more CCV changes. The travel and/or amount of the vehicle systems into the vehicle yard may be controlled such that the vehicle system arrives at the vehicle yard when the vehicle yard has sufficient capacity (e.g., space) to receive the vehicle system. Alternatively, in an embodiment, the vehicle system may be instructed to slow down as the vehicle system is traveling toward the vehicle yard, due to capacity restraints of the vehicle yard, so that an alternative vehicle system having a higher priority, respectively, may arrive or be received into the vehicle yard. The vehicle system may be instructed to slow down when doing so does not have a significantly negative impact (e.g., the impact is below a designated threshold) on the flow of traffic within a transportation network formed from interconnected routes, including the route on which the vehicle travels toward the vehicle yard.

While the discussion and figures included herein may be interpreted as focusing on rail yards as vehicle yards and rail vehicle consists (e.g., trains) as the vehicle systems, it should be noted that not all embodiments of the subject matter herein described and claimed herein are limited to rail yards, trains, and railroad tracks. (A consist is a group of vehicles that are mechanically linked to travel together.) The inventive subject matter may apply to other vehicles, such as airplanes, ships, or automobiles or the like. For example, one or more embodiments may select which airplane is selected to depart with a payload from an airport, a shipping facility (e.g., where the airplane drops off and/or receives cargo for delivery elsewhere), a repair or maintenance facility, or the like. Other embodiments may apply to control which ship is selected to depart with a payload from a ship yard or dock, which semi or delivery truck departs a repair facility, a shipping or distribution facility (e.g., where the automobile picks up and/or drops off cargo to be delivered elsewhere), or the like.

FIG. 1 is a schematic diagram of an embodiment of a transportation network 100. The transportation network 100 includes a plurality of interconnected routes 106, such as railroad tracks, roads, ship lanes, or other paths across which a vehicle system 102 travels. The routes 106 may be referred to as main line routes when the routes 106 provide paths for the vehicle systems 102 to travel along in order to travel between a starting location and a destination location (and/or to one or more intermediate locations between the starting location and the destination location). The transportation network 100 may extend over a relatively large area, such as hundreds of square miles or kilometers of area. While only one transportation network 100 is shown in FIG. 1, one or more other transportation networks 100 may be joined with and accessible to vehicles traveling in the illustrated transportation network 100. For example, one or more of the routes 106 may extend to another transportation network 100 such that vehicles can travel between the transportation networks 100. Different transportation networks 100 may be defined by different geographic boundaries, such as different towns, cities, counties, states, groups of states, countries, continents, or the like. The number of routes 106 shown in FIG. 1 is meant to be illustrative and not limiting on embodiments of the described subject matter. Moreover, while one or more embodiments described herein relate to a transportation network formed from railroad tracks, not all embodiments are so limited. One or more embodiments may relate to transportation networks in which vehicles other than rail vehicles travel, such as flights paths taken by airplanes, roads or highways traveled by automobiles, water-borne shipping paths (e.g., shipping lanes) taken by ships, or the like.

Several vehicle systems 102 travel along the routes 106 within the transportation network 100. The vehicle systems 102 may concurrently travel in the transportation network 100 along the same or different routes 106. Travel of one or more vehicle systems 102 may be constrained to travel within the transportation network 100. Alternatively, one or more of the vehicle systems 102 may enter the transportation network 100 from another transportation network or leave the transportation network 100 to travel into another transportation network. In the illustrated embodiment, the vehicle systems 102 are shown and described herein as rail vehicles or rail vehicle consists. However, one or more other embodiments may relate to vehicles other than rail vehicles or rail vehicle consists. For example, the vehicle systems can represent other off-highway vehicles (e.g., vehicles that are not designed or permitted to travel on public roadways), marine vessels, airplanes, automobiles, and the like. While three vehicle systems 102 are shown in FIG. 1, alternatively, a different number of vehicle systems 102 may be concurrently traveling in the transportation network 100 (e.g., more than three, less than three).

Each vehicle system 102 may include one or more PGV 108 (e.g., locomotives or other vehicles capable of self-propulsion) and/or one or more CCV 104. The CCV 104 is a non-propulsion-generating vehicle, such as cargo cars, passenger cars, or other vehicles incapable of self-propulsion. The PGV 108 and the CCV 104 are mechanically coupled or linked together forming a vehicle system 102 (e.g., a consist) to travel or move along the routes 106. The routes 106 are interconnected to permit the vehicle systems 102 to travel over various combinations of the routes 106 to move from a starting location to a destination location and/or an intermediate location there between.

Figure 2:
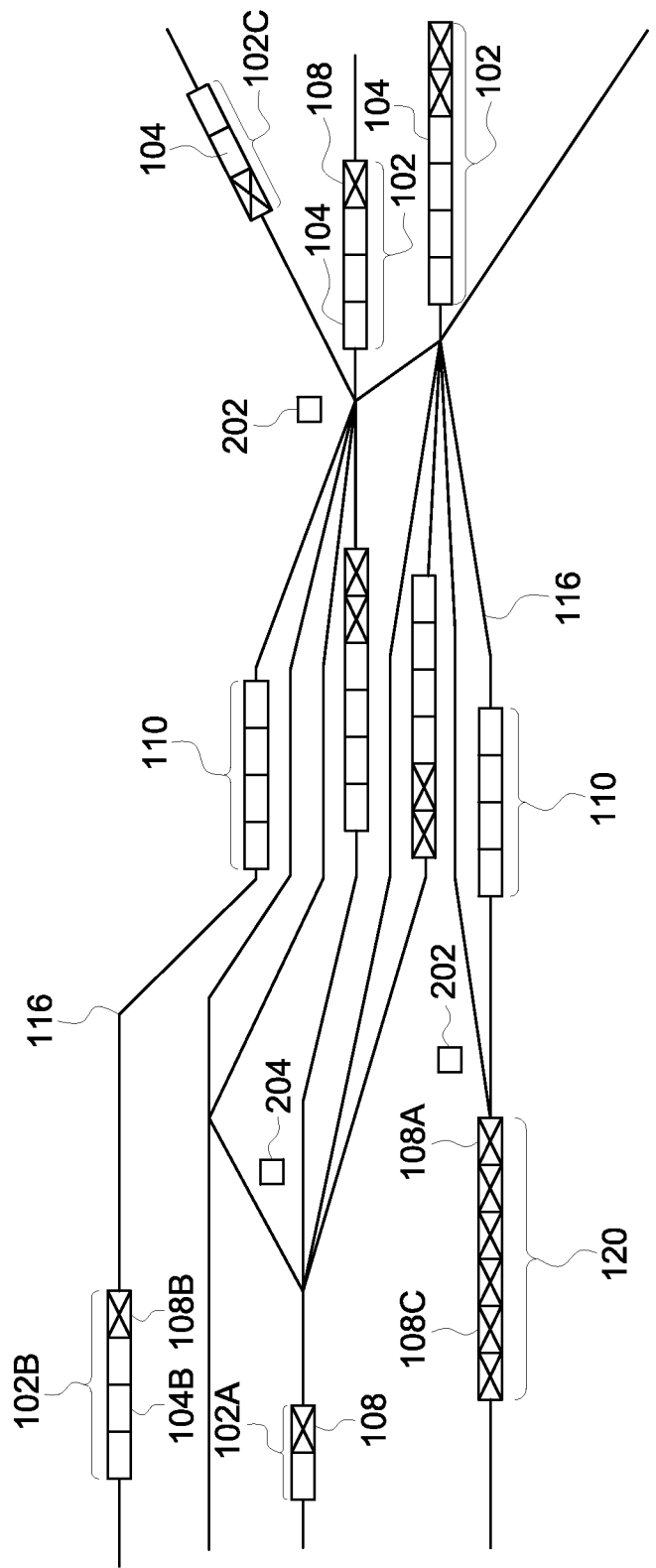
FIG. 2 is a schematic diagram of a vehicle yard in accordance with an embodiment.

The transportation network 100 includes one or more vehicle yards 200. While three vehicle yards 200 are shown, alternatively, the transportation network 100 may include a different number of vehicle yards 200. FIG. 2 is a schematic diagram of a vehicle yard 200 of the transportation network 100 having a control system 150 in accordance with an embodiment. The vehicle yard 200 is shown with a plurality of interconnected routes 116 that are located relatively close to each other. For example, the routes 116 in the vehicle yard 200 may be closer together (e.g., less than 10, 20, or 30 feet or meters between nearby routes 206) than the routes 106 outside of the vehicle yards 200 (e.g., more than several miles or kilometers between nearby routes 102). The number of interconnected routes 116 shown in FIG. 2 is meant to be illustrative and not limiting on embodiments of the described subject matter.

The vehicle yards 200 are located along the routes 106 in order to provide services to the vehicle systems 102, such as to repair or maintain the one or more PGV 108 (illustrated as a rectangle with an X in FIG. 2), re-order the sequence of vehicle systems 102 traveling along the routes 106 by adjusting an order to which the vehicle systems 102 exits the vehicle yard 200 relative to the order of the vehicle systems 102 entering vehicle yard 200, partitioning and storing the one or more PGV 108 and/or CCV 104 (illustrated as a rectangle in FIG. 2) of the vehicle system 102, load or couple additional CCV 104 and/or PGV 108 onto the vehicle system 102, or the like. In an embodiment, the vehicle yards 200 are not used as routes to travel from a starting location to a destination location. For example, the vehicle yards 200 may not be main line routes along which the vehicle systems 102 travel from a starting location to a destination location. Instead, the vehicle yards 200 may be connected with the routes 106 to allow the vehicle systems 102 to get off of the main line routes 106 for services described above.

Figure 3:
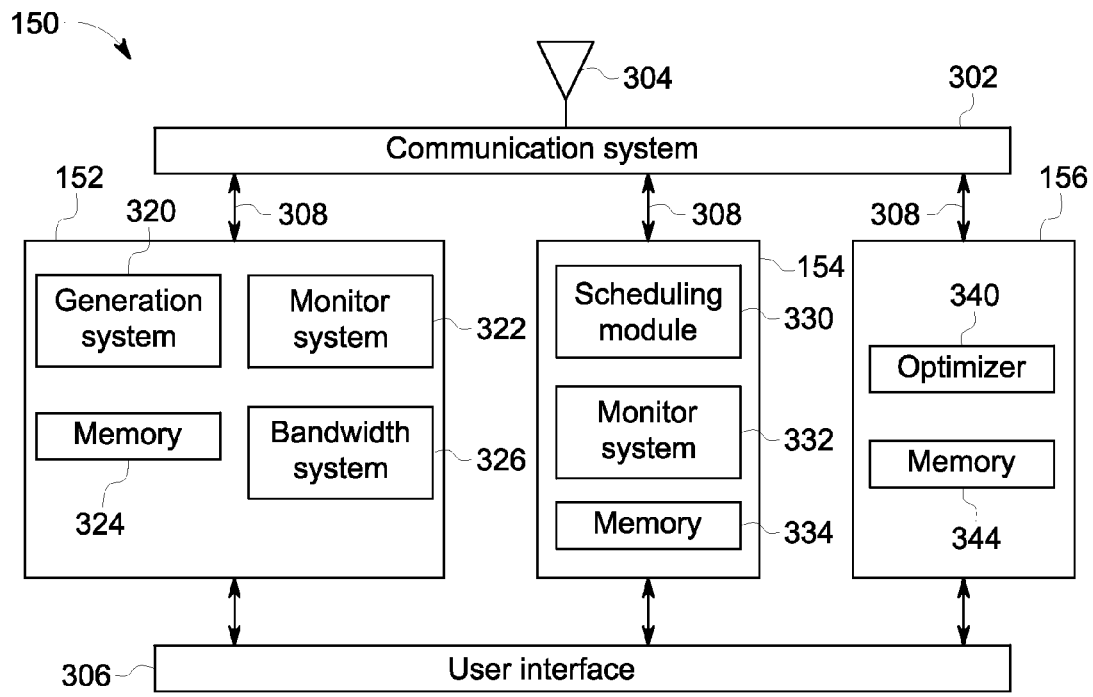
FIG. 3 is a simplified block diagram of an embodiment of a control system.

The services and operations of the rail yard 200 are controlled by the control system 150. The control system 150 includes various systems that perform operations within the vehicle yard 200. For example, as illustrated in FIG. 3, the control system 150 may include a communication system 302, a user interface 306, a yard planner system 152, a scheduling system 154, and an energy management system 156. The yard planner system 152 manages the planned activities within the vehicle yard 200, such as, processing operations that are scheduled to be performed on one or more PGV 108 and/or CCV 104 within the vehicle system 102, receiving the vehicle systems 102 into the yard 200, moving the vehicles (e.g., PGV 108, CCV 104, vehicle systems 102) through the yard 200 (including performing maintenance, inspection, cleaning, loading/unloading of cargo, or the like), and preparing or coupling the one or more PGV 108 and CCV 104 for departing the yard by forming vehicle systems 102 (e.g., consists) which may or may not be the same vehicle system 102 in which the CCV 104 and PGV 108 arrived into the vehicle yard 200. The scheduling system coordinates movement of the vehicle systems 102 within the transportation network 100. The energy management system 156 determines a vehicle configuration for one or more, or each, of the vehicle systems 102. The vehicle configuration can represent a set of one or more selected PGV 108 to be included in the vehicle system 102.

The systems described herein (e.g., systems included in the control system 150 and external to the control system 150) may include or represent hardware and associated instructions (e.g., software stored on a tangible and non-transitory computer readable storage medium (e.g., memory 324, 334 and 344), such as a computer hard drive, ROM, RAM, or the like) that perform the operations described herein. The hardware may include electronic circuits that include and/or are connected to one or more logic-based devices, such as microprocessors, processors, controllers, or the like. These devices may be off-the-shelf devices that perform the operations described herein from the instructions described above. Additionally or alternatively, one or more of these devices may be hard-wired with logic circuits to perform these operations. Two or more of the systems may share one or more electronic circuits, processors, and/or logic-based devices. In one or more embodiments, the systems described herein may be understood as including or representing electronic processing circuitry such as one or more field programmable gate arrays (FPGA), application specific integrated circuits (ASIC), or microprocessors. The systems may be configured to execute one or more algorithms to perform functions described herein. The one or more algorithms may include aspects of embodiments disclosed herein, whether or not expressly identified in a flowchart or as a step or operation of a method. Various embodiments described herein may be characterized as having different systems/elements (e.g., modules) that include one or more processors. However, it should be noted that the one or more processors may be the same processor or different processors (e.g., each system/element implemented in a separate processor(s), the system/elements all implemented in the same processor(s), or some systems/elements in the same processor(s), and others in different processor(s)).

The yard planner system 152 may include a monitoring system 322. The monitoring system may obtain input information used by the yard planner system 152 to create the yard plans and monitor the yard state information of the vehicle yard 200 and the vehicles (e.g., vehicle systems 102, CCV 104, PGV 108) within the yard 200.

The yard state information may indicate the status of the different vehicles (e.g., vehicle system 102, CCV 104, PGV 108) within the vehicle yard 200, such as where the vehicles currently are located, where the vehicles are expected (e.g., scheduled) to be located at a future time period, what operations are being performed on the vehicles, what resources (e.g., equipment, tools, personnel, or the like) are being expended or used to perform the operations on the vehicles, or the like. The yard state information may be obtained by the monitoring system 322 using messaging (e.g. peer-to-peer messaging) with management information systems, such as system-wide vehicle inventory management systems (that monitor which vehicles are in the yard and/or locations of the vehicles as the vehicles move through the yard), through direct data entry by the operators via the user interface 306. For example, the monitoring system 322 may receive the yard state information from the operator using yard workstations 202 such as computer workstations, tablet computers, mobile phones, and/or other devices through the communication system 302. Additionally or alternatively, some of the yard state information may be received, via the communication system 302, from one or more yard sensors 204 (e.g., include transponders, video cameras, track circuits, or the like) that measure or otherwise obtain data indicative of the yard state information.

Input information may include vehicle connection plans based on a priority and/or selection requests (e.g., for the vehicle system 102, CCV 104, PGV 108) received from the operator (e.g., using the user interface 306) and/or the energy management system 156, the destination locations (e.g., of the vehicle system 102, CCV 104, PGV 108) received from the operator and/or the scheduling system 154, or the like. A vehicle connection plan identifies one or more CCV 104 and/or one or more PGV 108 to be included or coupled to an outbound vehicle system 102 (e.g., vehicle 102 leaving the vehicle yard 200). Additionally or alternatively, the input information may include primary and secondary vehicle connection plans. The secondary vehicle connection plan may represent one or more additional output vehicle systems 102 that the one or more CCV 104 and/or the one or more PGV 108 may be coupled to or included to if the primary vehicle connection plan is unattainable. Optionally, the vehicle connection plans may include an order, priority list, or timing deadlines, related to the completion of the vehicle connection plan. In an embodiment the priority of the vehicle connection plan correlates to a priority of the vehicle system 102, CCV 104, and/or PGV 108 described below. The priority of the vehicle connection plan instructs the yard planner system 152 on the order of which vehicle system 102 relative to the other vehicle systems to be completed in the yard plan. Optionally, the yard planner system 152 may automatically transmit or signal to the operator within the vehicle yard 200 to direct the coupling to complete the vehicle connection plan of the one or more PGV with the CCV.

For example, the vehicle system 102B enters into the vehicle yard 200 having the CCV 104B. The yard planner system 152 receives input information from the scheduling system 154 that the CCV 104B is scheduled for a different destination location than the destination location of the vehicle system 102B. In order to ensure that the vehicle system 102B and CCV 104B reach the appropriate destination locations, the monitoring system 322 may match an outgoing vehicle system to the CCV 104B having similar destination locations or using the destination location of the outgoing vehicle system as the intermediate location for the CCV 104B. To determine a match, the monitoring system 322 may track the scheduled outbound destination locations of different vehicle systems 102 currently within the vehicle yard 200 or entering the vehicle yard 200 within a predetermined future time period (e.g., two hours before the predetermined departure time of the CCV 104B) by analyzing movement plans or schedule of the vehicle systems 102 from the scheduling system 154. Once the outgoing vehicle system is selected or matched, the yard planner system 152 may create a yard plan or modify an existing yard plan to decouple or partition the CCV 104B from the vehicle system 102B and couple the CCV 104B to the matched outgoing vehicle system.

Additionally or alternatively, if the matched outgoing vehicle system, determined by the monitoring system 322, is not within the vehicle yard 200 (e.g., the matched outgoing vehicle system is not in the yard or is not arriving within a predetermined future time period), the yard planner system 152 may create and/or modify the yard plan to decouple or partition the CCV 104B from the vehicle system 102B and couple the CCV 104B to a CCV group 110 to await coupling with the matched outgoing vehicle system and/or one or more PGV 108 to form the matched outgoing vehicle system. The CCV group 110 may be formed of one or more CCV 104 based on the predetermined departure time of the CCV 104, the destination location or intermediate location of the CCV 104, the type of payload within the CCV 104, selection by the operator of the vehicle yard 100, priority of the CCV 104, communication by a remote vehicle yard, or the like.

In an embodiment, the yard plan may be later modified or adjusted by the yard planning system 152 after the monitoring system 322 receives a PGV change request by the energy management system 156. For example, the monitoring system 322 receives the PGV change request from the energy management system 156 instructing that the vehicle system 102B should be coupled to the PGV 108A and not PGV 108B (e.g., the PGV 108B should be partitioned from the vehicle system 102B). The yard planning system 152 may modify or adjust the yard plan to partition the PGV 108B from the vehicle system 102B and couple the PGV 108A to the vehicle system 102B.

A bandwidth system 326 of the yard planner system 152 monitors constraints on the processing operations that are performed on one or more of the vehicles within the vehicle yard 200 in order to move the vehicle systems into, through, and out of the vehicle yard 200. The bandwidth system 206 may receive data representative of the processing constraints from one or more of the operators, sensors 204, or the like in order to track and/or update the processing constraints over time. The yard plans that are generated by the yard planner system 152 may be updated when the processing constraints change or significantly change such as from route configurations, vehicle inventory, route maintenance, or the like.

For example, the bandwidth system 206 may track route configurations in the yard 200. The route configuration includes the layout (e.g., arrangement, orientations, allowed directions of travel, intersections, or the like) of routes 116 (e.g., tracks) within the vehicle yard 200 on which the vehicles travel and/or are processed in the yard 200. The route configuration also can include the capacities of the routes 116 within the yard 200, such as the sizes of the routes 116 (e.g., lengths). Larger (e.g., longer) stretches of the routes 116 have a larger capacity for receiving vehicles than smaller (e.g., shorter) stretches of the routes 116. These capacities can change with respect to time as the number of vehicles in the yard 200 (and on the routes 116) changes, as segments of the route 116 are unavailable due to maintenance or repair, as segments of the routes 116 become available after being unavailable due to maintenance or repair, or the like.

As another example of processing constraints that can be monitored, the bandwidth system 326 may track vehicle inventories in the vehicle yard 200. Vehicle inventories can represent the locations of various (or all) of the vehicle systems 102, PGV 108 and/or CV 104 within the vehicle yard 200, the intended (e.g., scheduled) locations and/or routes that the vehicles are to occupy and/or travel along in the vehicle yard 200, the current and/or future (e.g., scheduled) status of the processing operations being performed on the various vehicles in the yard, or the like.

A generation system 320 of the yard planner system 152 plans movements of vehicles through the yard and processing activities to be performed on the vehicles to create the yard plan. As described above, the yard plan is a schedule of movements of the vehicles (e.g., vehicle systems 102, CCV 104, PGV 108) through different locations and/or along different routes 116 within the yard 200, as well as a schedule of processing operations to be performed on or with the vehicles at various locations of the vehicles, as the vehicles move from an inbound consist to an outbound consist.

The monitoring system 322 and/or bandwidth system 326 may obtain the information described above via the communication system 302 coupled to or wirelessly communicating with the yard planner system 152. The communication system 302 may include electronic circuitry and other hardware that communicates data signals with the scheduling system 154, the energy management system 156, remote control systems, the yard sensors 204, and/or the yard workstations 202. For example, the communication system 302 may include one or more antennas 304 for wirelessly communicating with the remote control systems, sensors 204, and/or workstations 202. Additionally or alternatively, the communication system 302 may be coupled with conductive communication pathways 308, such as one or more cables, busses, wires, rails, or the like, through which the information can be communicated with, for example, the yard planner system 152, the scheduling system 154, the energy management system 156, the yard sensors 204, and/or the yard workstations 202. As described below, the communication system 302 may send data signals to one or more of the yard workstations 202 in order to visually present the yard 200 to users of the workstations 202.

The scheduling information obtained by the yard planner system 152 may describe the intended routing and arrival and/or departure times of the vehicle system 102, CCV 104, and/or PGV 108 within the transportation network 100. The scheduling information or the movement plan may be determined or created by the scheduling system 154 coordinating the schedules of the various vehicle traveling within the transportation network 100 and through the vehicle yards 200. The movement plan may include the origin location of the vehicle system 120, CCV 104, and/or PGV 108, the destination location, and/or intermediate locations (e.g., vehicle yards 200). Additionally, the movement plan may list the vehicle yards 200 that the vehicles are to travel to and enter in during each portion (e.g., leg) of travel of the vehicles from the origin location to the respective destination locations. The scheduling system 154 may be disposed at a central dispatch office, within the vehicle yard 200, and/or within the vehicle system 102. The scheduling system 154 may create and communicate the scheduling information to one or more vehicle systems 102, the yard planner system 152, the energy management system 156, or the like through the communication system 302 using a wireless connection (e.g., radio frequency (RF)) or via the conductive communication pathway 308.

The scheduling system 154 includes several modules that perform various operations or functions described herein. The modules may include hardware and/or software systems that operate to perform one or more functions, such as one or more computer processors and/or one or more sets of instructions. The modules shown in FIG. 3 may represent the hardware (e.g., a computer processor) and/or software (e.g., one or more sets of instructions such as software applications or hard-wired logic) used to perform the functions or operations associated with the modules. A single hardware component (e.g., a single processor) and/or software component may perform the operations or functions of several modules, or multiple hardware components and/or software components may separately perform the operations or functions associated with different modules. The instructions on which the hardware components operate may be stored on a tangible and non-transitory (e.g., not a transient signal) computer readable storage medium, such as a memory 334. The memory 334 may include one or more computer hard drives, flash drives, RAM, ROM, EEPROM, or the like. Alternatively, one or more of the sets of instructions that direct operations of the hardware components may be hard-wired into the logic of the hardware components, such as by being hard-wired logic formed in the hardware of a processor or controller.

The scheduling system 154 may include a scheduling module 330 that creates schedules for the vehicle systems 102 within the transportation network 100 and the vehicle yards 200. The scheduling module 330 may form the movement plan, for example, by generating schedules for the vehicle systems 102 that are based (at least in part) on capacities of the vehicle yards 200 (shown in FIG. 2) to receive incoming vehicle systems 102. The scheduling module 330 may delay a scheduled arrival time for a vehicle system 102 to arrive at a vehicle yard 200 if doing so does not have a significant negative impact on the flow of traffic in the transportation network 100. For example, the scheduling module 330 may delay an arrival time of a vehicle system 102 such that delaying the arrival time does not decrease a throughput parameter of the transportation network 100 below a predetermined threshold.

The throughput parameter may represent the flow, rate, or movement of the vehicle systems 102 traveling through the transportation network 100 or a subset of the transportation network 100 (e.g., the vehicle yard 200, segment of the route 106). In an embodiment, the throughput parameter may indicate how successful the vehicle systems 102 are in arriving at the destination location or intermediate location according with respect to the schedule or movement plan associated with each vehicle system 102. For example, the throughput parameter may be a statistical measure of adherence of the vehicle systems 102 to the schedules of the vehicle systems 102 within the movement plan. The term "statistical measure of adherence" may refer to a quantity that is calculated for a vehicle system 102 indicating how closely the vehicle system 102 is following the schedule associated with the vehicle system 102. Further, several statistical measures of adherence to the movement plan may be calculated for more than one or various vehicle systems 102 traveling within the transportation network 100.

The monitoring module 332 may determine the throughput parameters for the transportation network 100, or an area thereof, based on the statistical measures of adherence associated with the vehicle systems 102. For example, a throughput parameter may be an average, median, or other statistical calculation of the statistical measures of adherence for the vehicle systems 102 concurrently traveling in the transportation network 100. The throughput parameter may be calculated based on the statistical measures of adherence for all, substantially all, a supermajority, or a majority of the vehicle systems 102 traveling in the transportation network 100.

The scheduling system 154 may include a monitoring module 332 which monitors travel of the vehicle systems 102 within the transportation network 100 (shown in FIG. 1) and/or capacities of the vehicle yards 200 over time. The vehicle systems 102 may periodically report current positions of the vehicle system 102 to the scheduling system 154 (and/or other information such as route and speed) so that the monitoring module 332 may track where the vehicle systems 102 are located over time. Alternatively, signals or other sensors disposed alongside the routes 106 and 116 of the transportation network 100 may periodically report the passing of vehicle system 102 by the signals or sensors to the scheduling system 152. Optionally, the monitoring module 332 may track the capacities of the vehicle yards 200 (shown in FIG. 2) by monitoring how many vehicle systems 102 enter and how many vehicle systems 102 leave each of the vehicle yards 200. Additionally or alternatively, the monitoring system 322 may receive vehicle connection plan status updates from the yard planner system 152 relating to the position or estimate of when the vehicle system 102 may leave the vehicle yard 200.

The monitoring module 332 may determine the throughput parameters of the transportation network 100 (shown in FIG. 1) and/or areas of the transportation network 100 that are used by the scheduling module 330. The monitoring module 332 may calculate the throughput parameters based on the schedules of the vehicle systems 102 and deviations from the schedules by the vehicle systems 102. For example, in order to determine a statistical measure of adherence to the schedule associated with the vehicle system 102, the monitoring module 332 may monitor how closely the vehicle system 102 adheres to the schedule (e.g., arrival times of the vehicle system 102 at a destination or intermediate location compared to the scheduled arrival time) as the vehicle system 102 travels within the transportation network 100.

The vehicle system 102 may adhere to the schedule of the vehicle system 102 by proceeding along a path on the route 106 toward the scheduled destination or intermediate location such that the vehicle system 102 will arrive at the scheduled location at the scheduled arrival time or within a predetermined time buffer of the scheduled arrival time. For example, an estimated time of arrival (ETA) of the vehicle system 102 may be calculated as the time that the vehicle system 102 will arrive at the scheduled destination or intermediate location if no additional anomalies (e.g., mechanical failures, route damage, route traffic, waiting for vehicle connection plan at the vehicle yard 200, or the like) occur that changes the speed or departure from an intermediate location (e.g., vehicle yard 200) at which the vehicle system 102 travels. If the ETA is the same as or within a predetermined time buffer the scheduled arrival time, then the monitoring module 332 may calculate a large statistical measure of adherence for the vehicle system 102. As the ETA differs from the scheduled arrival time (e.g., by occurring after the scheduled arrival time), the statistical measure of adherence may decrease.

Additionally or alternatively, the vehicle system 102 may adhere to the schedule by arriving at or passing through scheduled waypoints of the schedule at scheduled times that are associated with the waypoints, or within the predetermined time buffer of the scheduled times. As differences between actual times that the vehicle system 102 arrives at or passes through the scheduled waypoints and the associated scheduled times of the waypoints increases, the statistical measure of adherence for the vehicle system 102 may decrease. Conversely, as these differences decrease, the statistical measure of adherence may increase.

The monitoring module 332 may calculate the statistical measure of adherence as a time difference between the ETA of the vehicle system 102 and the scheduled arrival time of the schedule associated with the vehicle system 102. Alternatively, the statistical measure of adherence for the vehicle system 102 may be a fraction or percentage of the scheduled arrival time. For example, the statistical measure of adherence may be the difference between the ETA and the scheduled arrival time over the scheduled arrival time. Optionally, the statistical measure of adherence may further include the ETA of the vehicle system 102 to a number of scheduled waypoints (e.g., between the origin location and/or intermediate locations and the destination location) along the path of the movement plan for the vehicle system 102 and the scheduled arrival time. Alternatively, the statistical measure of adherence may be a sum total, average, median, or other calculation of time differences between the actual times that the vehicle system 102 arrives at or passes by scheduled waypoints and the associated scheduled times.

The differences between when the vehicle system 102 arrives at or passes through one or more scheduled locations and the time that the vehicle system 102 was scheduled to arrive at or pass through the scheduled locations may be used to calculate the statistical measure of adherence to a schedule for the vehicle system 102. In an embodiment, the statistical measure of adherence for the vehicle system 102 may represent the number or percentage of scheduled locations that the vehicle system 102 arrived too early or too late. For example, the monitoring module 332 may count the number of scheduled locations that the vehicle system 102 arrives at or passes through outside of a time buffer around the scheduled time. The time buffer can be one to several minutes. By way of example only, if the time buffer is three minutes, then the monitoring module 332 may examine the differences between the scheduled times and the actual times and count the number of scheduled locations that the vehicle system 102 arrived more than three minutes early or more than three minutes late. Alternatively, the monitoring module 332 may count the number of scheduled locations that the vehicle system 102 arrived early or late without regard to a time buffer.

The monitoring module 332 may calculate the statistical measure of adherence by the vehicle system 102 to the schedule based on the number or percentage of scheduled locations that the vehicle system 102 arrived on time (or within the time buffer). For example, the monitoring module 332 may calculate that the vehicle system 102 adhered to the schedule (e.g., remained on schedule) for 71% of the scheduled locations and that the vehicle system 102 did not adhere (e.g., fell behind or ahead of the schedule) for 29% of the scheduled locations. Additionally or alternatively, the monitoring module 332 may calculate the statistical measure of adherence by the vehicle system 102 to the schedule based on the total or sum of time differences between the scheduled times associated with the scheduled locations and the actual times that the vehicle system 102 arrived at or passed through the scheduled locations.

In an embodiment, the monitoring module 332 may calculate the average statistical measure of adherence by comparing the deviation of each vehicle system 102 from the average or median statistical measure of adherence of the several vehicle systems 102 traveling within the transportation network 100. For example, the monitoring module 332 may calculate an average or median deviation of the measure of adherence for the vehicle systems 102 from the average or median statistical measure of adherence of the vehicle systems 102.

Additionally, the scheduling system 154 may assign the priority to the vehicle system 102 and/or the vehicles within the vehicle system 102 (e.g., the CCV 104, the PGV 108) which may be used by the yard planner system 152 (as described above). The priority may be based on the throughput parameter or statistical measure of adherence determined by the monitoring module 332, a business objective of the transportation network 100 (e.g., delivery deadline of a payload of the CCV 104, reliance on the vehicle system 102 and/or PGV 108 by a plurality of other vehicle systems 102), by the operator of the vehicle yard 200, the central dispatch or other office that generates the trip plans for one or more vehicle systems 102, or the like.

Figure 4:
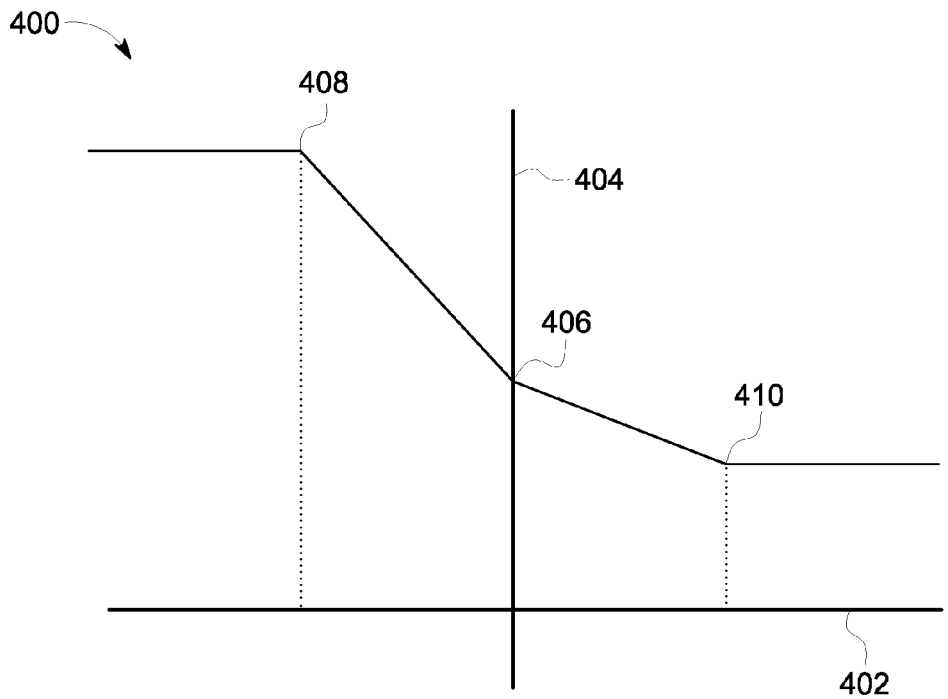
FIG. 4 is an illustration of a priority curve used by an embodiment of a scheduling system.
Figure 5:
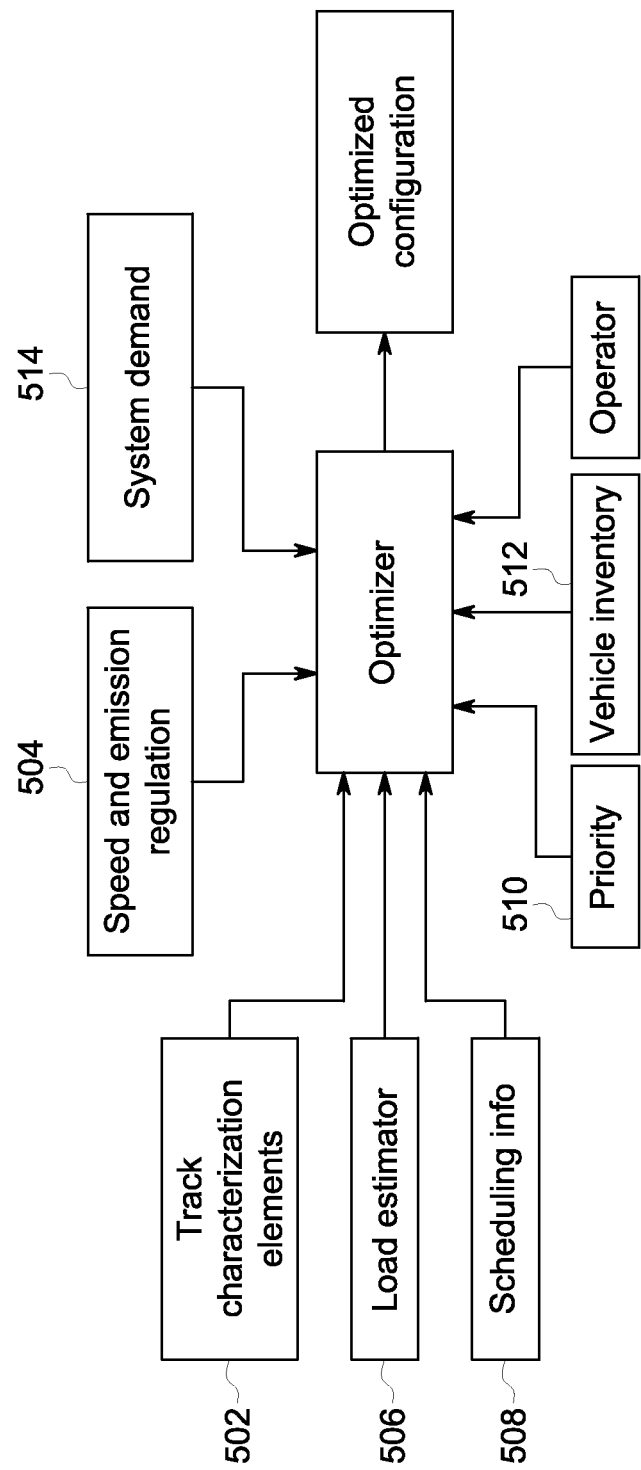
FIG. 5 is an illustration of information used by an optimizer of an energy management system in accordance with an embodiment.

FIG. 4 illustrates a priority curve 400 that may be used by the scheduling system 154. The priority curve 400 may be predetermined and stored on memory 334, received by the scheduling system 154 from an input by the operator using the user interface 302, or the like. The x-axis 402 may represent the statistical measure of adherence. For example, a position traversing left along the x-axis 402 exemplifies a decreasing statistical measure of adherence (e.g., ETA of the vehicle system 102 is greater than or later in time than the scheduled time of arrival), and conversely the position traversing right along the x-axis 402 exemplifies an increasing statistical measure of adherence (e.g., ETA of the vehicle system 102 is lesser than or earlier in time than the scheduled time of arrival). The y-axis 404 represents the priority, such that, a position traversing upwards and away from the x-axis 402 exemplifies an increasing priority and conversely the position traversing towards the x-axis exemplifies a decreasing priority. For example, the monitoring module 332 is tracking three vehicles systems 102A, 102B and 102C entering the vehicle yard 200 (FIG. 2) each having a movement plan. The monitoring module 332 determines a statistical measure of adherence for each vehicle system with respect to the priority curve 400, such that, 406 represents the vehicle system 102A, 408 represents the vehicle system 102B, and 410 represents the vehicle system 102C. Further, using the priority curve 400 the monitoring module 332 may determine a priority (e.g., value of the y-axis) associated for each vehicle system 102A, 102B, 102C and may output the said priorities to the yard planner system 152, using the communication system 302. The priority may be represented as a number for each vehicle system 102, a list of the vehicle systems 102 within the transportation network 100 and/or in the vehicle yard 200 in a priority order, a color scheme, or the like. The yard planner system 152 may determine or adjust the yard plan based on the priority of the incoming vehicle systems 102A, 102B, and 102C and/or vehicle systems 102 currently within the vehicle yard 200. For example, the yard planner system 152 may complete the vehicle connection plan of the vehicle system 102B, represented as 408 on the priority curve 400, before the vehicle connection plans of the vehicle systems 102A and 102C, respectively, due to the higher priority of the vehicle system 102B.

The energy management system 156 may be embodied in hardware, such as a processor, controller, or other logic-based device, that performs functions or operations based on one or more sets of instructions (e.g., software). The instructions on which the hardware operates may be stored on a tangible and non-transitory (e.g., not a transient signal) computer readable storage medium, such as a memory 344. The memory 344 may include one or more computer hard drives, flash drives, RAM, ROM, EEPROM, or the like. Alternatively, one or more of the sets of instructions that direct operations of the hardware may be hard-wired into the logic of the hardware.

The energy management system 156 determines an optimized vehicle system configuration for the movement plan which may be used by the yard planner system 152 to determine a vehicle connection plan to create the yard plan and/or to adjust an existing yard plan. As used herein, the term "optimize" (and forms thereof) are not intended to require maximizing or minimizing a characteristic, parameter, or other object in all embodiments described herein. Instead, "optimize" and its forms are intended to mean that a characteristic, parameter, or other object is increased or decreased toward a designated or desired amount. For example, an "optimized" vehicle system configuration for fuel efficiency is not limited to a complete absence of fuel consumption or that the absolute minimum amount of fuel is consumed by the vehicle system. Rather, the optimized vehicle system configuration for fuel efficiency may mean that the fuel efficiency is increased, but not necessarily maximized, relative to other possible vehicle system configurations available. However, the "optimized" vehicle system configuration for fuel efficiency can include reducing fuel consumption to the minimum amount possible. As another example, optimized vehicle system configuration for emission generation may not mean completely eliminating the generation of all emissions from the vehicle system. Instead, optimized vehicle system configuration for emission generation may mean that the amount of emissions generated by the vehicle system is reduced but not necessarily eliminated relative to other possible vehicle system configurations available. However, optimized vehicle system configuration for emission generation can include reducing the amount of emissions generated to a minimum amount possible. In an embodiment, the "optimized" vehicle system configuration for a characteristic (e.g., fuel efficiency, generated emissions, weight distribution), parameter (e.g., tractive effort), or other object includes increasing or decreasing the characteristic, parameter, or object (as appropriate) during performance of a mission (e.g., a trip) such that the characteristic, parameters, or object is increased or decreased (as appropriate) relative to performing the same mission in another vehicle system configuration. For example, the energy management system 156 determined that the PGV 108A selected for the vehicle system 102A traveling along a trip according to an optimized vehicle system configuration and trip plan and may result in the vehicle system 102A consuming less fuel and/or generating fewer emissions relative to traveling along the same trip having another vehicle configuration, such as having PGV 108B rather than PGV 108A for the vehicle system 102A.

The optimized vehicle configuration, for example, may be determined by an optimizer module 340 analyzing or calculating different timing and load demands of the vehicle system 102 and the transportation network 100 using different input information. The optimizer module 340 may analyze the movement plan of the vehicle system 102, specifically, the scheduling information 508 (e.g., timing requirements of the vehicle system 102 to arrive at the destination or intermediate location), speed and emission regulations 504 (e.g., predetermined and based on the route 106 location), track characterization elements 502, the vehicle inventory 512, and the load estimator 506 to determine a minimum tractive effort threshold required to be produce by the one or more PGV 108 selected for the optimized vehicle configuration for the vehicle system 102. The optimizer module 340 further selects the one or more PGV 108 based on a sum of the tractive effort produced from each of the PGV 108 of the vehicle inventory 512 is at least or greater than the minimum tractive effort threshold of the vehicle system 102 to arrive within a predetermined time period (e.g., scheduling information 508), and an optimization requirement (e.g., fuel consumption, emission generation) received from the operator, the dispatch facility, or the like. Optionally, the optimizer module 340 may additionally base the selection and/or optimized vehicle configuration of the vehicle system 102 on the weight distribution of the vehicle system 102.

The tractive effort is representative of the tractive effort the one or more PGV 108 units are capable of and/or need to provide to propel the vehicle system 102 along the route 106 and 116. The tractive effort may be a measure of pounds force or traction amps (for electric motors). The tractive effort may vary along the movement plan due to changes in parameters, for example, changes in a curvature and/or grade of the route 106, speed limits and/or requirements of the vehicle system 102, or the like. As these parameters change during the movement plan, the total tractive effort, or force, that is required to propel the vehicle system 102 along the track 106 may also change.

The track characterization elements 502 may provide information, for example terrain characteristics, about the remaining segments or portions of the route 106 to be traveled by the vehicle system 102 from the vehicle yard 200 to the destination location and/or remaining intermediate locations before the destination location (e.g., other vehicle yards 200) while following the movement plan. The track characterization elements 402 may be used by the optimizer module 340 to account for additional or reduced tractive effort needed by the one or more PGV 108 until the destination or intermediate location. For example, the vehicle system 102 following the movement plan along the route 106 that has a negative average track grade from the vehicle yard 200 to the destination or intermediate locations. The negative average track grade of the movement plan may require a lower minimum tractive effort threshold of the vehicle system 102 than a positive or zero average track grade, respectively. The track characterization elements 402 may include grade, elevation, curvature information, or the like of the remaining segments of the route 106.

The vehicle inventory may be received by the optimizer module 340 from the yard planner system 152 using the communication system 302 and/or stored on the memory 344. The vehicle inventory 512 may include a database of all available PGV 108 within the vehicle yard 200. The availability of the PGV 108 may be based on the vehicle connection plans of the yard plan (e.g., the available PGV 108 are not included in any vehicle connection plans), the maintenance cycles of the PGV 108, user input by the operator (e.g., through the user interface 306), or the like.

Additionally or alternative, the yard plan may isolate or store the one or more available PGV 108 into a larger group of PGV 120 within the vehicle yard 200. The database may include characteristics of the available PGV 108 such as the weight, propulsion capabilities or tractive effort, fuel efficiency with respect to various speed or tractive efforts, range capabilities on a single fueling, or the like. The vehicle inventory 512 may also include or identify the CCV 104 that are to be included into the optimized vehicle system configuration from the movement plan and/or yard plan (e.g., vehicle connection plans). Optionally, the vehicle inventory 512 may include PGV 108 and/or CCV 104 that are included in vehicle systems 102 that are inbound (e.g., next stop is the vehicle yard 200) within a set distance of the vehicle yard 200 or scheduled to arrive into the vehicle yard 200 within a predetermined future time period (e.g., within thirty minutes of the scheduled departure time of the vehicle system being optimized).

The load estimator 560 calculates a load of the vehicle system 102 based on information contained in the vehicle inventory or yard plan (e.g., the CCV 104 to be included in the vehicle system 102), historical data, a rule of thumb estimation, and/or table data.

In an embodiment, the optimizer module 340 may receive the priority of the vehicle system 102 and/or the CCV 104 from the scheduling system 154 through the communication system 302, vehicle yard operator, dispatch facility, or the like and adjust the minimum tractive effort threshold. For example only, the optimizer module 340 has determined the minimum tractive effort threshold for the vehicle system 102B, not accounting for the priority of the vehicle system 102B, is 40,000 Newtons (N). The vehicle inventory 512 includes the PGV 108B (currently coupled to the vehicle system 102B) and the larger group PGV 120 having the PGV 108A and PGV 108C. The tractive effort of the PGV 108B is 30,000 N which is below the minimum tractive effort threshold for the vehicle system 102B when leaving the vehicle yard 200. The tractive effort of the PGV 108A is 44,000 N and the tractive effort of the PGV 108C is 51,000 N which are both greater than the minimum tractive effort threshold. However, regarding fuel consumption and/or generation of emissions traveling along the movement plan, the PGV 108A is determined by the optimizer module 340 to consume less fuel and/or generates less emissions, respectively, than the PGV 108B. Due to the lower fuel consumption and/or less emissions the optimizer module 340 selects the PGV 108A, and outputs the PGV selection to the yard planner 152 as the vehicle connection plan for vehicle system 102B.

Conversely, continuing with the above example, the inclusion of the priority of the vehicle system 102B may affect the selection of the one or more PGV 108 by the optimizer module 340. The vehicle system 102B may be represented at 408 on the priority curve 400 (FIG. 4) illustrating a high priority. The high priority of the vehicle system 102B may require the vehicle system 102B to demand more power or tractive effort of the one or more PGV 108 (e.g., quick acceleration, higher speed) beyond the preset requirements described above (e.g., track characterization elements, load estimator). Accordingly, the optimizer module 340 may determine that the minimum tractive effort threshold of the vehicle system 102B should be increased to 50,000 N. Due to the high priority of the vehicle system 102B, the optimizer module 340 selects the PGV 108C having a tractive effort of 50,000 N even though the PGV 108A has a higher fuel efficiency, respectively.

In an embodiment, the optimizer module 340 may adjust the selection of the one or more PGV 108 based on the availability of vehicles at the destination or intermediate locations based on a system demand database 514. The system demand database 514 may log requests or status alerts from remote vehicle yards, operators, dispatch facilities, the schedule system 154, or the like of a shortage or need for one or more PVG 108 having certain characteristics (e.g., tractive effort, speed, generated emissions, fuel efficiency). The requests on the system demand database 514 may be automated by the scheduling system 154 to maintain an equal distribution of one or more PGV 108 having a higher tractive effort, set fuel efficiency, emissions, or the like. Optionally, the requests may represent a future or current need by the remote vehicle yard 200 for a PGV 108 having a tractive effort for an awaiting vehicle system 200 within the remote vehicle yard 200.

For example only, the optimizer module 340 has determined the minimum tractive effort threshold for the vehicle system 102A is 35,000 N. The vehicle inventory 512 includes the PGV 108B coupled to an incoming vehicle system (the vehicle system 102B) and the larger group PGV 120 having the PGV 108A and PGV 108C. The tractive efforts are of the PGV 108B is 30,000 N, of the PGV 108A is 44,000 N, and of the PGV 108C is 51,000 N. The optimizer module 340 may compare the movement plan of the vehicle system 102A with the system demand database 514 and determine that one of the intermediate locations (e.g., vehicle yards 200) has a request listed within the system demand database 514 for a PVG 108 having a tractive effort of over 40,000 N. The optimizer module 340 may reset or adjust the minimum tractive effort threshold to match the requested tractive effort of the remote vehicle yard 200 of 40,000 N resulting in the selection of PGV 108A and/or PGV 108C.

Figure 6:
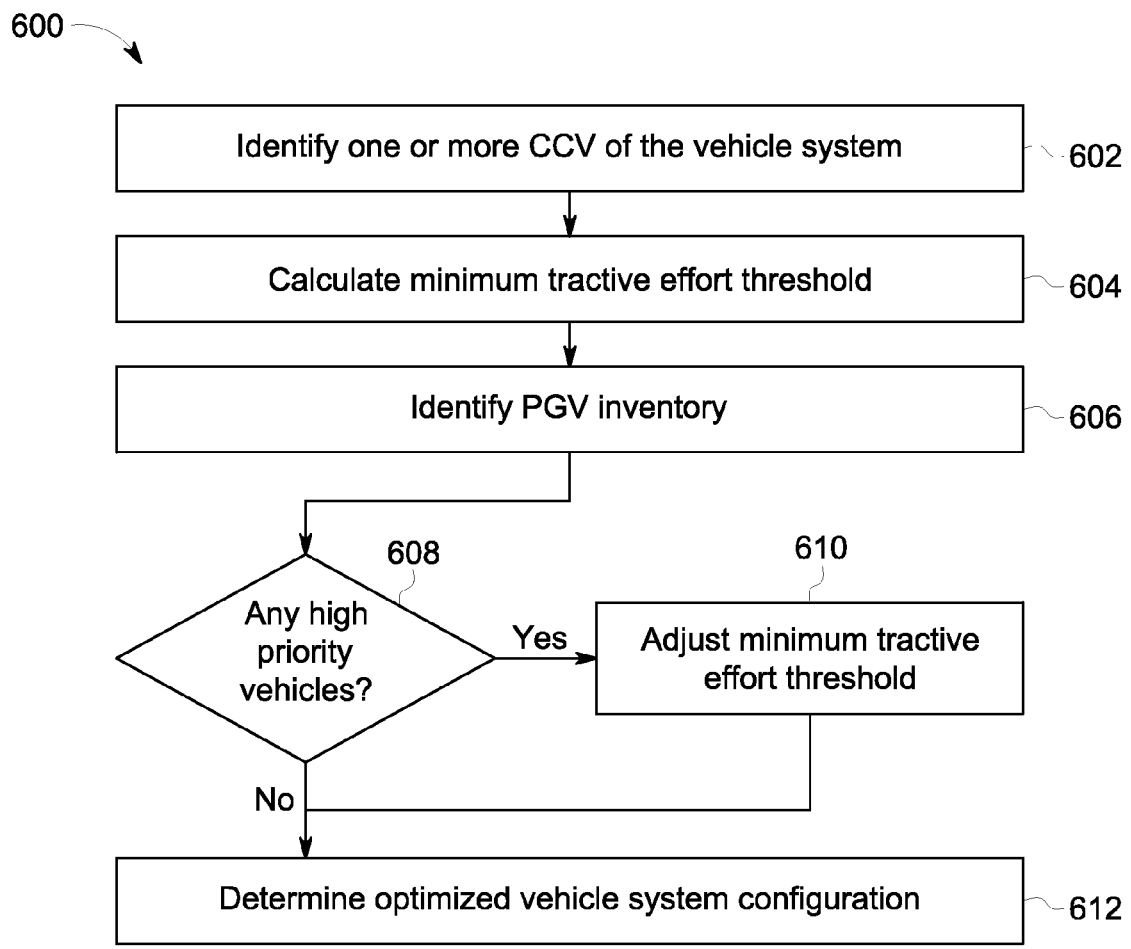
FIG. 6 is a flowchart of an embodiment of a method for a control system of a vehicle yard within a transportation network.

FIG. 6 is a flowchart of a method 600 for a control system 150 for the vehicle yard 200 within a transportation network 100. The method 600 for example, may employ or be performed by structures or aspects of various embodiments (e.g., systems and/or methods) discussed herein. In various embodiments, certain steps may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion. In various embodiments, portions, aspects, and/or variations of the method 600 may be able to be used as one or more algorithms to direct hardware to perform one or more operations described herein. Additionally or alternatively, the method 600 may represent a work flow for the operator of a vehicle yard 200.

At 602, identify the one or more CCV 104 for the vehicle system 102. For example, the one or more CCV 104 may be identified by the scheduling system 154 based on the predetermined departure time of the CCV 104, the destination location or intermediate location of the CCV 104, the type of payload within the CCV 104, selection by the operator of the vehicle yard 100, priority of the CCV 104, communication by a remote vehicle yard, or the like. Additionally or alternatively, the yard planner system 152 may identify the one or more CCV 104 using the monitoring system 322 and group the CCV 104 into a CCV group 110 to await coupling with the matched outgoing vehicle system and/or one or more PGV 108 to form the matched outgoing vehicle system.

At 604, calculate the minimum tractive effort threshold. As described above, the energy management system 156 may determine the minimum tractive effort threshold by analyzing the movement plan of the vehicle system 102, specifically, the scheduling information 508 (e.g., timing requirements of the vehicle system 102 to arrive at the destination or intermediate location), speed and emission regulations 504 (e.g., predetermined and based on the route 106 location), track characterization elements 502, the vehicle inventory 512, and the load estimator 506 to determine a minimum tractive effort threshold required to be produce by the one or more PGV 108 selected for the optimized vehicle configuration for the vehicle system 102.

At 606, identify the PGV inventory. As described above, the PGV inventory may be included within the vehicle inventory database 512 received by the optimizer module 340. The PGV inventory may include all available PGV 108 within the vehicle yard 200 based on the vehicle connection plans of the yard plan (e.g., the available PGV 108 are not included in any vehicle connection plans), the maintenance cycles of the PGV 108, user input by the operator (e.g., through the user interface 306), or the like. Additionally, the optimizer module 340 may include PGV 108 within the vehicle inventory database 512 that are included in vehicle systems 102 that are inbound within a set distance of the vehicle yard 200 or scheduled to arrive into the vehicle yard 200 within a predetermined future time period (e.g., within thirty minutes of the scheduled departure time of the vehicle system being optimized).

At 608, determine whether there are any high priority vehicles. If there are high priority vehicles, at 610, adjust the minimum tractive effort threshold. As described above, the priority of the vehicles (e.g., vehicle system 102, CCV 104, PGV 108) may be determined using the priority curve 400 (FIG. 4) by the scheduling system 154, the operator, or the like. Based on the priority of the vehicle, as described above, the optimizer module 340 may adjust the minimum tractive effort threshold, for example, the optimizer module 340 may increase the minimum tractive effort threshold of a high priority vehicle system 102 relative to a low priority vehicle system 102 due to the priority of the vehicle system 102.

At 612, determine an optimized vehicle system configuration. As described above, the optimizer module 340 within the energy management system 156 determines the optimized vehicle configuration by isolating the one or more PGV 108 within the larger group of PGV available within the vehicle inventory database 512 having a tractive effort greater than the minimum tractive effort threshold. Additionally, depending on what is being optimized (e.g., fuel efficiency, emission generation), the optimizer module 340 determines which set of the one or more PGV 108 to be included within the vehicle system 102 having the highest fuel efficiency and/or lowest emission generation relative to the larger group of PGV available within the vehicle inventory database 512.

Optionally, the method 600 may further include automatically generating one or more signals to be communicated to an operator in the vehicle yard 200 to direct coupling of the set of one or more PGV 108 with the CCV 104 to form the vehicle system 200.

Optionally, the method 600 may further include determining a priority of the vehicle system 200 within a rail network 100. The priority of the vehicle system 200 adjusts the minimum tractive effort threshold.

Optionally, the method 600 may additionally base the minimum tractive effort threshold on a terrain of the route 106.

Optionally, the method 600 may further have the selection of the set of one or more PGV 108 further based on a planned position of the set of one or more PGV 108 within the vehicle system 102. Alternatively, the selection of the set of one or more PGV 108 is further based on a weight distribution of the vehicle system. Alternatively, the selection of the set of one or more PGV 108 is further based on a number of available PGV 108 from a remote vehicle yard along the route 106 or a communication from the remote vehicle yard along the route 106.

Optionally, the method 600 may further have the larger group of PGV include PGV 108 entering the vehicle yard 200 within a predetermined future time period. Additionally, the method 600 may further include determining a priority of the CCV 104, such that the priority of the CCV adjusts which PGV 108 are available within the larger group of PGV.

In an embodiment, the memories 324, 334, and/or 344 may contain maintenance data of each PGV 108 within the transportation network 100 and/or vehicle yard 200. The maintenance data may include a maintenance or repair history of the PGV 108 (may include type and date of work completed on the PGV 108), life span or life expectancy of parts installed in the PGV 108 (e.g., bearings, axles, rotors, wheels, lights, air brake valve, or the like), general maintenance schedule of the PGV 108 based on a predetermined distance traveled or a predetermined time of a previous maintenance service (e.g., flushing of fluids, check lubrication), or the like. The maintenance data may be used to determine whether a maintenance cycle of the PGV 108 may be scheduled and included in the yard plan (e.g., vehicle connection plan) to complete a maintenance task (e.g., flushing of fluids, replacing a bearing, or the like) within the vehicle yard 200. For example only, the PGV 108B of the vehicle system 102B enters the vehicle yard 200. The yard planning system 152 may access the general maintenance schedule relating to the PGV 108B stored on the memory 324 determining (e.g., based on a length of time from the last maintenance cycle, based on a distance traveled from the last maintenance cycle) that the maintenance cycle for the PGV 108B may be scheduled and included in the yard plan. Accordingly, the yard planning system 152 may include a vehicle connection plan to partition the PGV 108B from the vehicle system 102B to fulfill the maintenance cycle of the PGV 108B within the vehicle yard 200.

Optionally, the method 600 may have the selection of the set of the one or more PGV 108 further based on the maintenance cycles of the one or more PGV 108. In an embodiment, select vehicle yards 200 within the transportation network 100 may perform maintenance tasks (e.g., replacing bearings within the electric motor) faster than or may have a needed replacement part (e.g., axle) for the maintenance cycle of the PGV 108 relative to other vehicle yards 200 within the transportation network 100. The maintenance task performance (e.g., duration of time to complete the maintenance task) and/or a replacement part inventory of the vehicle yards 200 may be stored within a maintenance database in the memory 344. Additionally, the optimizer module 340 may determine the vehicle configuration of the vehicle system 102 based on the maintenance cycle of the PGV 108.

For example only, a vehicle system 102B that includes the PGV 108B enters the vehicle yard 200A. The PGV 108B, based on the maintenance data, may be determined to need or is due for a maintenance cycle. The maintenance cycle for the PGV 108B may be added to the scheduling information 508. The optimizer module 340, analyzing the scheduling information 508, may determine an idle time based on the maintenance database (e.g., maintenance task performance, replacement inventory) for the vehicle yard 200A and other vehicle yards 200 (e.g., the vehicle yard 200B) within the transportation network 100. The idle time may represent the amount or duration of time the PGV 108B may be unavailable (e.g., not included within the vehicle inventory 512) due to the completion of the maintenance cycle. It should be noted, the idle time may also include an amount of time for the vehicle yard 200 to order or receive a needed replacement part for the maintenance cycle into the replacement part inventory. The optimizer module 340 may compare the idle times for the maintenance cycles performed at various vehicle yards 200, respectively, against a predetermined idle threshold. Once the idle times are determined, the optimizer module 340 may determine the selection of the set of one or more PGV 108 for the various vehicle systems 102 in order to minimize the PGV 108 idle times within the transportation network 100. For example, the optimizer module 340 may determine that the idle time, based on the maintenance cycle, for the vehicle yard 200A may be greater than the predetermined idle threshold. Further, the optimizer module 340 may determine that the idle time, based on the maintenance cycle, within the vehicle yard 200B may be below the predetermined idle threshold. Based on the idle times of the vehicle yards 200, the optimizer module 340 may adjust the selection of the set of one or more PGV 108 based on the destination or intermediate location of the vehicle system 102. For example, the optimizer module 340 may include and/or flag (e.g., prioritize over alternative PGV 108 meeting optimization requirements) the PGV 108B within the vehicle inventory 512 for vehicle systems 102 that have the vehicle yard 200B as a destination or intermediate location within the scheduling information 508.

Conversely, continuing with the example above, the optimizer module 340 may determine that the PGV 108B has an idle time below the predetermined idle threshold for the vehicle yard 200A. Since the idle time is below the predetermined threshold, the optimizer module 340 may instruct the yard planner system 152 to remove the PGV 108B from the available vehicle inventory 512 and include a vehicle connection plan in the yard plan to partition or decouple the PGV 108B from the vehicle system 102B for the maintenance cycle.

In an embodiment, the control system 150 includes the yard planner system 152 having one or more processors. The yard planner system 152 may be configured to create the yard plan for the vehicle yard 200 that includes a vehicle connection plans for coupling a selection of one or more propulsion generating vehicles (PGV) 108 with a selection of one or more cargo-carrying vehicles (CCV) 104 to form a first vehicle system. The yard plan is further created based on the movement plan and an optimized vehicle system configuration of the first vehicle system. The control system 150 also includes the schedule system 154 having one or more processors. The schedule system 154 is configured to create the movement plan of the first vehicle system. The movement plan includes a destination location and predetermined arrival time of the first vehicle system along a route. The control system 150 further includes the energy management system 156 having one or more processors. The energy management system is configured to determine the optimized vehicle system configuration. The optimized vehicle system configuration includes the selection of the one or more PGV 108 from a vehicle inventory having a larger group of PGV (e.g., the larger PGV group 120), based on the movement plan of the first vehicle system and a tractive effort of the selection of the one or more PGV 108.

Optionally, the selection of the one or more PGV 108, by the control system 150, may be further based on fuel consumption and/or emission generation such that the selected one or more PGV 108 have a lower fuel consumption and/or generate less emission than the remaining PGV (e.g., the larger PGV group 120) in the vehicle inventory. It should be noted that the selected one or more PGV 108 has a lower fuel consumption and/or generates less emission with respect to having or respectively to the fuel consumption and/or emissions generated if the one or more of the remaining PGV forming and propelling the vehicle system 102 to the subsequent intermediate location or final destination along the same movement plan.

Optionally, the selection of the one or more PGV 108, by the control system 150, may be further based on the weight distribution of the first vehicle system.

Optionally, the energy management system 156 may be configured to determine the minimum tractive effort threshold required to propel the first vehicle system along the route at or within the predetermined arrival time, and the tractive effort of the selected one or more PGV is at least or greater than the minimum tractive effort threshold. Additionally, the minimum tractive effort threshold may be further based on the terrain of the route.

Optionally, the vehicle inventory may include PGV entering the vehicle yard 200 within a predetermined future time period.

Optionally, the vehicle inventory may be adjusted based on a number of available PGV from a remote vehicle yard 200 along the route or a communication from the remote vehicle yard.

Optionally, the schedule system 154 of the control system 150 may be further configured to assign a priority of the first vehicle system based on the statistical measure of adherence. The statistical measure of adherence may be determined from a position of the first vehicle system relative to a scheduled position of the first vehicle system determined by the movement plan. Additionally, the yard planner system 152 may be configured to adjust the yard plan based on the priority of the first vehicle system, such that, the vehicle connection plan of the first vehicle system displaces a vehicle connection plan of a second vehicle system having a different priority, relatively. Additionally or alternatively, the vehicle inventory may be adjusted based on the priority of the first vehicle system.

Optionally, the yard planner system 152 may generate one or more signals communicating the yard plan to an operator in the vehicle yard 200 to direct coupling of the selection of the one or more PGV 108 with the selection of the one or more CCV 104 to form the first vehicle system.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f), unless and until such claim limitations expressly use the phrase "means for" followed by a statement of function void of further structure.

This written description uses examples to disclose several embodiments of the inventive subject matter, including the best mode, and also to enable one of ordinary skill in the art to practice the embodiments of inventive subject matter, including making and using any devices or systems and performing any incorporated methods. The patentable scope of the inventive subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the present inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, or the like). Similarly, the programs may be stand alone programs, may be incorporated as subroutines in an operating system, may be functions in an installed software package, or the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "comprises," "including," "includes," "having," or "has" an element or a plurality of elements having a particular property may include additional such elements not having that property.

What is claimed is:

1. A control system comprising:
   a yard planner system having one or more processors configured to create a yard plan for a vehicle yard, wherein the yard plan includes a vehicle connection plan for coupling a selection of one or more propulsion generating vehicles (PGV) with a selection of one or more cargo-carrying vehicles (CCV) forming a first vehicle system, and wherein the yard plan is created based on a movement plan and an optimized vehicle system configuration of the first vehicle system;
   a schedule system having one or more processors configured to create the movement plan of the first vehicle system, wherein the movement plan includes a destination location and predetermined arrival time of the first vehicle system along a route; and
   an energy management system having one or more processors configured to determine the optimized vehicle system configuration, wherein the optimized vehicle system configuration includes the selection of the one or more PGV from a vehicle inventory having a larger group of PGV based on the movement plan of the first vehicle system and a tractive effort of the selection of the one or more PGV.

2. The control system of claim 1, wherein the selection of the one or more PGV is further based on at least one of a fuel consumption or generating emissions such that the selected one or more PGV have a lower fuel consumption and/or generate less emissions than the remaining PGV in the vehicle inventory.

3. The control system of claim 2, wherein the selection of the one or more PGV is further based on a weight distribution of the first vehicle system.

4. The control system of claim 1, wherein the energy management system is configured to determine a minimum tractive effort threshold required to propel the first vehicle system along the route at or within the predetermined arrival time, and the tractive effort of the selected one or more PGV is at least or greater than the minimum tractive effort threshold.

5. The control system of claim 4, wherein the minimum tractive effort threshold is further based on the terrain of the route.

6. The control system of claim 1, wherein the vehicle inventory includes PGV entering the vehicle yard within a predetermined future time period.

7. The control system of claim 1, wherein the vehicle inventory is adjusted based on a number of available PGV from a remote vehicle yard along the route or a communication from the remote vehicle yard.

8. The control system of claim 1, wherein the schedule system is further configured to assign a priority of the first vehicle system based on a statistical measure of adherence, wherein the statistical measure of adherence is determined from a position of the first vehicle system relative to a scheduled position of the first vehicle system determined by the movement plan.

9. The control system of claim 8, wherein the yard planner system is configured to adjust the yard plan based on the priority of the first vehicle system, such that the vehicle connection plan of the first vehicle system displaces a vehicle connection plan of a second vehicle system having a different priority, relatively.

10. The control system of claim 8, wherein the vehicle inventory is adjusted based on the priority of the first vehicle system.

11. The control system of claim 1, wherein the yard planner system is configured to generate one or more signals communicating the yard plan to an operator in the vehicle yard to direct coupling of the selection of the one or more PGV with the selection of the one or more CCV to form the first vehicle system.

* * * * *